US010784707B2

(12) United States Patent
Floresca et al.

(10) Patent No.: US 10,784,707 B2
(45) Date of Patent: Sep. 22, 2020

(54) INDUCTIVE POWER TRANSFER SYSTEM

(71) Applicant: Apple Inc., Cupertino, CA (US)

(72) Inventors: Ron Rafer Floresca, Auckland (NZ);
Saining Ren, Auckland (NZ); Michael Scott Eckert, Auckland (NZ); Daniel Lorenz Huber, Auckland (NZ); Selestino Langi Rodan, Auckland (NZ); Lawrence Bernardo dela Cruz, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/137,286

(22) Filed: Sep. 20, 2018

(65) Prior Publication Data

US 2019/0341797 A1 Nov. 7, 2019

Related U.S. Application Data

(60) Provisional application No. 62/668,150, filed on May 7, 2018.

(51) Int. Cl.
*H02J 7/00* (2006.01)
*H02J 7/02* (2016.01)
*H02M 3/158* (2006.01)
*H02J 50/10* (2016.01)

(52) U.S. Cl.
CPC ........ *H02J 7/025* (2013.01); *H02J 7/007184* (2020.01); *H02J 50/10* (2016.02); *H02M 3/1582* (2013.01)

(58) Field of Classification Search
CPC ...................................................... H02J 7/025
USPC ........................................................ 320/108
See application file for complete search history.

(56) References Cited

U.S. PATENT DOCUMENTS

| 2013/0285604 | A1* | 10/2013 | Partovi | H02J 7/0042 |
| | | | | 320/108 |
| 2014/0111153 | A1* | 4/2014 | Kwon | H02J 7/025 |
| | | | | 320/108 |
| 2014/0159655 | A1* | 6/2014 | Kim | H02J 7/04 |
| | | | | 320/108 |
| 2015/0207333 | A1 | 7/2015 | Baarman et al. | |
| 2015/0340880 | A1 | 11/2015 | Kdoshim et al. | |
| 2016/0020620 | A1 | 1/2016 | Lee et al. | |
| 2016/0268833 | A1 | 9/2016 | Lee et al. | |
| 2016/0268834 | A1 | 9/2016 | Satyamoorthy et al. | |

(Continued)

*Primary Examiner* — Yalkew Fantu
(74) *Attorney, Agent, or Firm* — Blank Rome LLP

(57) ABSTRACT

An inductive power receiving device configured to: supply power received with a power receiving coil to a load in a first mode; determine whether a converter voltage exceeds a threshold voltage; in response to the determining the converter voltage exceeds the threshold voltage after sending a charging mode request, switch to supplying power received with the power receiving coil to the load in a second mode; and in response to determining the converter voltage coil exceeds the threshold voltage before sending the charging mode request is sent, prevent at least a portion of the power received with the power receiving coil from reaching the load. An inductive power transmitting device configured to provide an alternating current voltage to a power transmitting coil and gradually increase the voltage after receiving a charging mode request and stop gradually increasing the voltage once an inductive power receiving device changes modes.

35 Claims, 12 Drawing Sheets

(56) References Cited

U.S. PATENT DOCUMENTS

2017/0047769 A1  2/2017  Kim et al.
2017/0256973 A1  9/2017  Kim et al.
2018/0212470 A1* 7/2018  Leem ..................... H02J 50/12

* cited by examiner ations of the invention and, together with the general
INDUCTIVE POWER TRANSFER SYSTEM This application claims the benefit of provisional patent application No. 62/668,150, filed May 7, 2018, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface or zone wirelessly transmits power to a portable electronic device. The portable electronic device receives the inductively transmitted power and uses this power to charge an internal battery or to power the device.

SUMMARY

With the advancement of battery technology, some batteries can now be fast charged for a short period of time. This feature can only be realized if the power source can support such power burst.

However, wireless charging systems can be slow to change between different levels of power at which they operate. This can result in slower than desired charging, excessive time spent changing power levels, and potentially damage to components of the system. For example, in situations where a wireless power transmitter incrementally increases its level of output power in response to requests from a wireless power receiver, it may take many successive requests and incremental power increases for the power transmitter to reach an adequate power level for fast charging.

In some cases, wireless power transmitting and receiving devices can be designed to be closely coupled to each other. Typically, this is achieved by arranging the coils of the transmitting and receiving devices such that they are aligned with and close to each other in use. Systems in which the transmitting and receiving devices can be closely coupled to each other in use are sometimes referred to as inductive power transfer systems. Transmitting and receiving devices that can be closely coupled to receiving devices can be referred to as inductive power transfer devices.

In the system, an inductive power transmitting device transmits wireless power signals to an inductive power receiving device. The inductive power transmitting device includes a converter that provides signals to one or more wireless power transmitting coils for transmitting power wirelessly to the inductive power receiving device. The inductive power receiving device includes one or more wireless power receiving coils for receiving power wirelessly from the inductive power transmitting device. The inductive power receiving device can operate in a first charging mode and a second charging mode.

The inductive power receiving device includes a communication circuit for communicating with the inductive power transmitting device. The communication circuit can send a charging mode request to the inductive power transmitter to begin the process of changing from a first charging mode to a second charging mode.

The inductive power transmitting device includes a communication circuit for communicating with the inductive power receiving device. The communication circuit can receive a charging mode request from the inductive power receiving device and, in response, change the output of the converter to allow the receiver to change to a second charging mode.

When the inductive power transmitting device receives the charging mode request from the inductive power receiving device, the converter of the inductive power transmitting device can gradually increase the voltage of alternating current signals provided to one or more transmitting coils. The gradual increase of the voltage provided to the one or more transmitting coils will continue until the inductive power receiving device enters the second charging mode.

The inductive power receiving device includes a charging circuit that provides power received by the one or more power receiving coils to a load in a first charging mode and a second charging mode. When a charging mode request has been sent to the power transmitting device, the charging circuit determines whether a voltage generated from the power received with the power receiving coil(s) exceeds a threshold amount. If it is determined that the voltage has exceeded the threshold amount, the charging circuit switches to the second charging mode.

The inductive power receiving device includes a measurement circuit to measure the voltage generated from the power received the inductive power receiving coils and provides an indication of this to the charging circuit.

The system allows the inductive power receiving device to quickly change from charging a load in a first, low-power charging mode to a second, high-power charging mode. The time taken to transition from the first mode to the second mode may be relatively short, which allows for relatively high energy transfer in a short period of time.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone or other electronic devices. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, electronic pencil or stylus, other portable electronic device, or other wireless power receiving equipment.

During operation, the wireless power transmitting device supplies alternating-current signals to one or more wireless power transmitting coils. This produces a time varying electromagnetic field (sometimes referred to as wireless power signals) which may be coupled to one or more corresponding receiving coils in the wireless power receiving device. Rectifier circuitry in the wireless power receiving device converts the induced voltage in the receiving coil into direct-current (DC) voltage for powering the wireless power receiving device.

Figure 1:
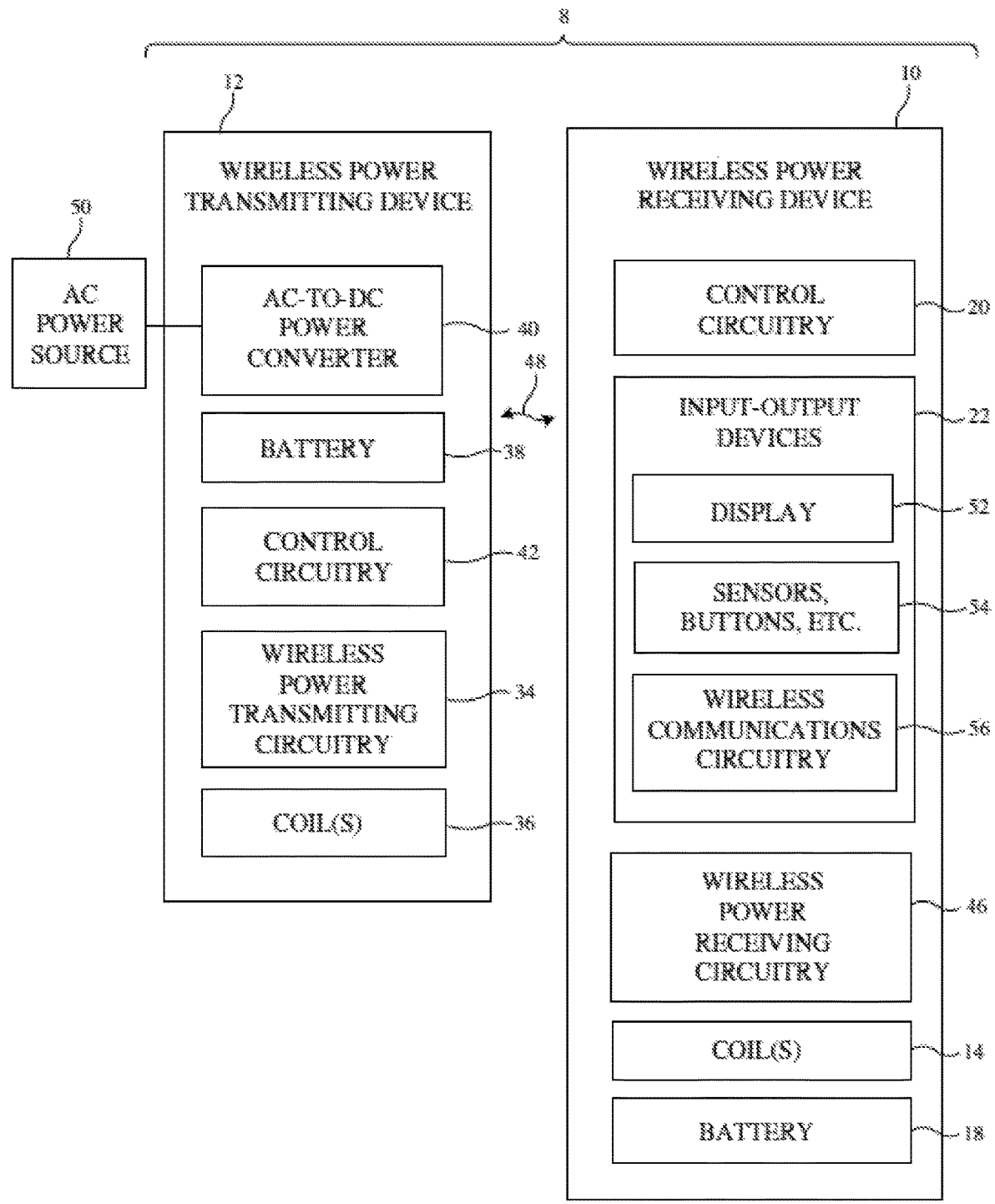
FIG. 1 is a schematic diagram of an illustrative wireless charging system in accordance with some embodiments.

An illustrative wireless power system (wireless charging system) is shown in FIG. 1. As shown in FIG. 1, a wireless power system 8 includes a wireless power transmitting device 12 and one or more wireless power receiving devices such as wireless power receiving device 10. Device 12 may be a stand-alone device such as a wireless charging mat, may be built into furniture, laptop or tablet computers, cellular telephones or other electronic devices, or may be other wireless charging equipment. Device 10 is a portable electronic device such as a wristwatch, a cellular telephone, a tablet computer, an electronic pencil or stylus, or other electronic equipment. Illustrative configurations in which device 12 is a tablet computer or similar electronic device and in which device 10 is an electronic accessory that couples with the tablet computer or similar electronic device during wireless power transfer operations may sometimes be described herein as examples. Illustrative configurations in which device 12 is a mat or other equipment that forms a wireless charging surface and in which device 10 is a portable electronic device or electronic accessory that rests on the wireless charging surface during wireless power transfer operations may also sometimes be described herein as examples.

During operation of system 8, a user places one or more devices 10 on or near the charging region of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 40 can be included to convert power from a mains power source or other AC power source into DC power that is used to power control circuitry 42 and other circuitry in device 12. During operation, control circuitry 42 uses wireless power transmitting circuitry 34 and one or more coils 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the switching circuitry, a time varying electromagnetic field (wireless power signals 48) or "flux" is produced. If the time varying electromagnetic field is magnetically coupled to coil 14, an AC voltage is induced and a corresponding AC currents flows in coil 14. Rectifier circuitry in circuitry 46 can convert the induced AC voltage in the one or more coils 14 into a DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, Bluetooth, wireless communications circuits 56 for communicating wirelessly with control circuitry 42 of device 12 and/or other equipment, audio components, and other components (e.g., input-output devices 22 and/or control circuitry 20) and/or are used in charging an internal battery in device 10 such as battery 18, or to charge subsequent devices, either wired or wirelessly.

Devices 12 and 10 include control circuitry 42 and 20. Control circuitry 42 and 20 may include storage and processing circuitry such as analogue circuitry, microprocessors, power management units, baseband processors, digital signal processors, field-programmable gate arrays, microcontrollers, application-specific integrated circuits with processing circuits and/or any combination thereof. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g. tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as circuitry 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). For example device 12 and/or device 10 may communicate using in-band communications injected or combined into the wireless power signals 48 such as proposed in the Wireless Power Consortium Qi specification 1.1, which is incorporated herein by reference. Alternatively, a separate Bluetooth®, RFID, NFC, Zigbee, Wifi, RF or other communication system may be employed.

Figure 2:
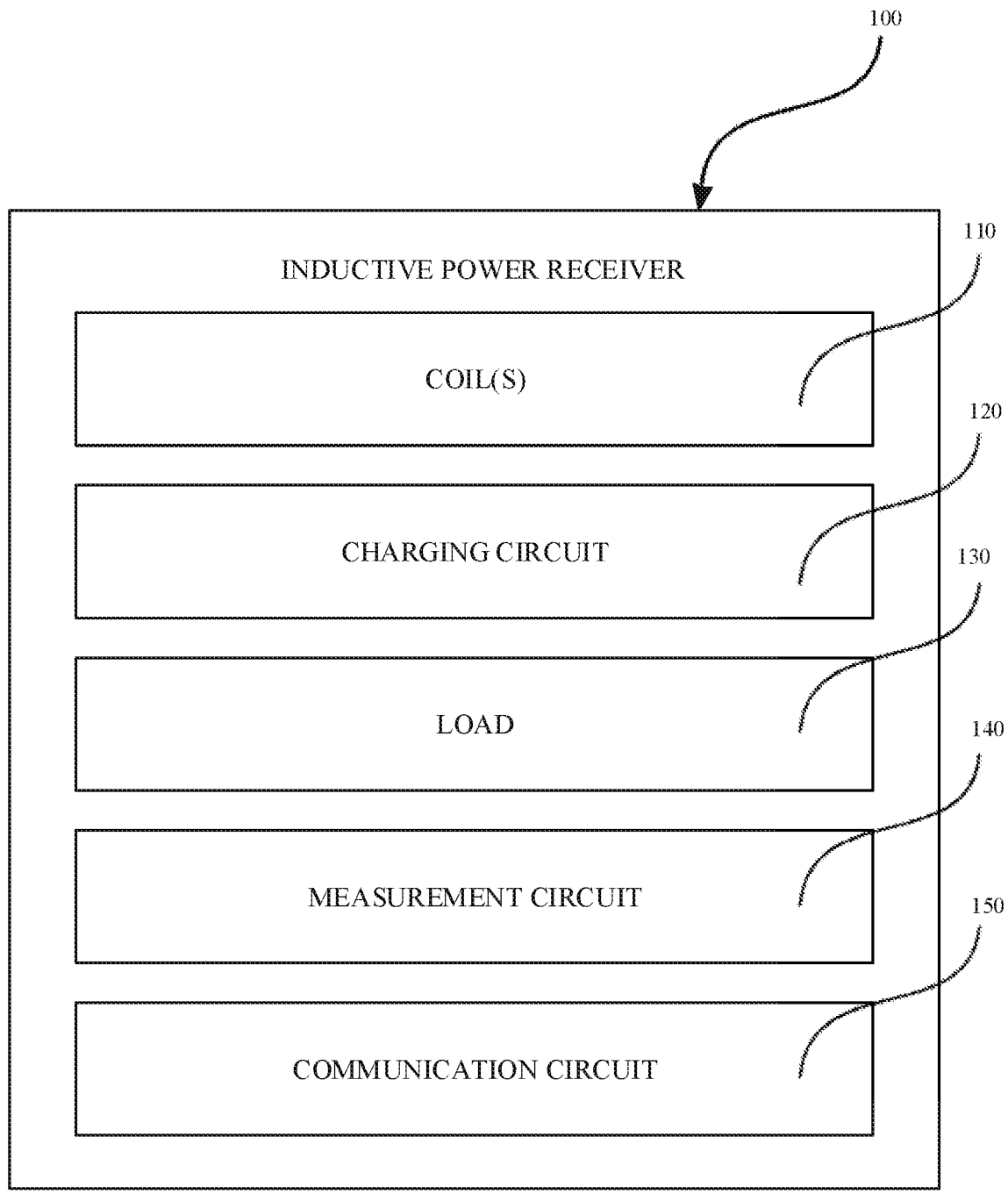
FIG. 2 is a schematic diagram of an illustrative inductive power receiving device in accordance with an embodiment.

An illustrative inductive power receiver 100 is shown in FIG. 2. The receiver 100 includes a power receiving coil 110 for receiving wireless power signals, a charging circuit 120 for converting the received wireless power signals to a form suitable for a load 130, and a load 130 for receiving power. The receiver 100 also includes a measurement circuit 140 for measuring a voltage in the receiver 100 and a communication circuit 150 for communicating with an inductive power transmitter 200.

Various types of power receiving coils can be used in the receiver 100 to receive wireless power signals. For example, the receiver coil 110 can be planar or elongate depending on the application. The coil 110 could also be provided with a magnetic core that can guide and focus magnetic fields near the receiver coil 110.

The receiver 100 could have a plurality of power receiving coils that could be connected in parallel or series. In some examples, the receiver 100 can have two or more coils wound about respective limbs of a magnetic core to form a coil assembly.

It will be appreciated that the coil or coils may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

Various types of load 130 could be used in the inductive power receiver 100. For example, the load 130 could be a rechargeable battery or cell of the lithium-ion, lithium-polymer, lead-acid, nickel-cadmium, nickel-metal hydride type, or other type. It will be appreciated that the load 130 could also include a capacitor or super capacitor. The load 130 could also include a combination of these types of loads. The load 130 may have a capacity of between 40 mAH and 100 mAH.

The charging circuit 120 of the inductive power receiver 100 may be configured to convert alternating current (AC) power signals received in the coil 110 into direct current (DC) power signals. To this end, the charging circuit 120 may include full bridge rectifier, half-bridge rectifier or other AC to DC converter. The rectifier may use diodes or controlled switches or transistors to perform rectification.

The charging circuit 120 of the inductive power receiver 100 may be configured to regulate or control the received power to a desired level. To this end, the charging circuit 120 may include a switchmode converter such as a buck converter, boost converter, buck-boost converter, push-pull converter, flyback converter or another type of converter. These converters include a regulation stage which controls the output voltage provided by the converter to a desired level. These converters may include a rectification stage, in which case a separate rectification stage is not necessary.

It will be appreciated that various other types of circuitry or components could be included in the charging circuit 120 to convert the received power to a desired level or form.

The charging circuit 120 is configured to operate in a first mode and a second mode. In the first mode, the charging circuit 120 supplies power to the load 130 at a first level. In the second mode, the charging circuit 120 supplies power to the load 130 at a second level. For example, the charging circuit 120 may supply 5 Watts or less in the first mode and may supply more than 5 Watts in the second mode. In some examples, the charging circuit 120 may supply approximately 7.5 Watts or 15 Watts in the second mode. In other examples, the charging circuit 120 may supply less than 3 Watts in the first mode and approximately 3 Watts or more in the second mode.

The charging circuit 120 may be configured to charge the load 130 at a particular charging rate. In the first mode the rate may be less than 2 C and in the second mode the rate may be at least 5 C. For example, in the first mode the charging circuit 120 may charge the load 130 at between 0.5 C and 5 C; between 0.75 C and 3.5 C; or approximately 1 C. In the second mode the charging circuit 120 may charge the load 130 at between 7.5 C and 15 C; between 8.5 C and 12.5 C; or approximately 10 C.

During operation in the first mode, the charging circuit 120 may deliver power with power flow control similar to Qi charging wherein it requests increased power from a transmitter using a positive control error packet and requests decreased power from a transmitter using a negative control error packet.

During operation in the second mode, the charging circuit 120 may utilize power flow control similar to the first mode.

For the charging circuit 120 to switch to 10 C mode, it may ramp at a predetermined ramp rate until it reaches 10 C point or alternatively use the Qi power flow control but at a faster rate in order to reach the final point as fast as possible. When using Qi power flow control to reach 10 C, the time between sending CEP packets can be selected to reach the 10 C level quickly. These packets can be sent at a faster rate than in standard Qi power flow control. For example, CEP packets can be sent consecutively every 50 ms. In one example, the charging circuit 120 can include a voltage rectifier and a voltage regulator, for example a switchmode regulator. The rectifier can be a full diode bridge rectifier. The switchmode regulator can be controlled based on a pulse-width modulation (PWM) signal provided to one or more switches of the switchmode regulator. A controller may provide the PWM signal to the switch or switches to control the level of power provided to the load 130.

The charging circuit 120 may be configured such that the receiver 100 operates in the second mode for less than 120 seconds, less than 60 seconds, less than 30 seconds or less than 15 seconds.

Operating the charging circuit 120 at a high charge rate for a short period of time can allow the load to be at least partially charged very quickly. For example, an electronic accessory such as an electronic pencil or stylus can be placed on, in or near an inductive power transmitter when the accessory's battery is substantially out of charge—i.e. the battery can not provide enough power to operate the accessory. The battery can then be charged at 10 C for 15 seconds to provide enough charge for the accessory to be used immediately after the short charging period.

The measurement circuit 140 of the inductive power receiver 100 may be configured to measure a voltage in the inductive power receiver 100 that is based on power received with the coil 110. This allows the inductive power receiver 100 to determine when the voltage produced in the inductive power receiver 100 has reached a suitable level for the receiver 100 to change to the second mode.

For example, the measurement circuit 140 may measure the output voltage from a rectification stage of the charging circuit 120. As described in further detail below, the inductive power transmitter 200 gradually increases the voltage applied to its transmission coil to allow the inductive power receiver 100 to switch to the second mode. This means that the AC voltage across the inductive power receiver coil 110 and the DC voltage at the output of the rectifier stage will also increase.

It will be appreciated that the measurement circuit 140 may measure voltage in various other parts of the circuit that are based on the power received with the power receiver coil 110. For example, the measurement circuit 140 may measure the output of a regulator connected to the rectifier.

In one example, the measurement circuit may include an opamp comparator to compare the output voltage of the rectification stage to a threshold voltage. The result of this comparison can then be provided to a controller. The controller determines when the output of the rectification stage exceeds the threshold voltage from a change in the output of the comparator.

To supply power at a desired level to the load 130, or to charge the load 130 at a desired rate, a corresponding amount of power needs to be received with the inductive power receiver 100. The charging circuit 120 is configured to determine when the amount of power available to the inductive power receiver 100 is sufficient for charging the load 130 in the high power mode by comparing the voltage measured by the measurement circuit 140 to a threshold voltage. The charging circuit 120 may compare the measured voltage to the threshold voltage using one or more discrete components such as a comparator, one or more integrated circuits such as an application-specific integrated circuit (ASIC), one or more programmable devices such as a microprocessor or microcontroller, or other analog or digital comparison means.

It will be appreciated that the specific value of the threshold voltage may depend on various factors such as the desired charging rate or power in the higher power mode, the part of the circuit at which the voltage is measured, voltage drops in the receiver circuitry and other considerations. The threshold voltage in a particular application may be determined through experimentation by finding the voltage at which the charging circuit 120 can charge the load 130 at the desired charging rate or power when switched to the second mode. The threshold voltage in a particular application may also be determined from a theoretical analysis of the physical components of the system and their known properties or by simulation of the system. In some examples, the threshold voltage may be between 12V and 16V or approximately 14V.

The communication circuit 150 allows the inductive power receiver 100 to communicate with the inductive power transmitter 200 using either modulation of the inductive power signals (in band communication) or other communication channels (out of band communication). As discussed above, these can include signals injected or combined into the inductive power signals such as proposed in the Wireless Power Consortium Qi specification 1.1, Bluetooth®, RFID, NFC, Zigbee, Wifi, RF or other communication systems.

The inductive power receiver 100 uses the communication circuit 150 to transmit a charging mode request to the inductive power transmitter 200 to initiate the change from the first mode to the second mode. In some examples the inductive power receiver 100 can also use the communication circuit 150 to transmit a charging mode confirmation to the inductive power transmitter 200 to confirm that the receiver 100 has switched to the second mode.

The communication circuit 150 can use power negotiation packets to communicate with the inductive power transmitter 200. The charging mode request is in terms of the power needed for 10 C, that is 10 times the normal power rating of the battery or any value greater than the normal power rating of the battery. The charging mode confirmation can be in the form of negotiated power, that is it will enter 10 C if negotiated power is 10 times the normal power rating, or 6 C if the negotiated power is 6 times the normal power rating; more generally it will enter nC if negotiated power is n times the normal power rating, where n is any positive number.

The charging mode request may be a CEP packet or a power negotiation packet requesting a 3 Watt mode, a 7.5 Watt mode or a 15 Watt mode.

The communication circuit 150 can also transmit requests for incremental power increases or decreases during the first mode or the second mode.

Figure 3:
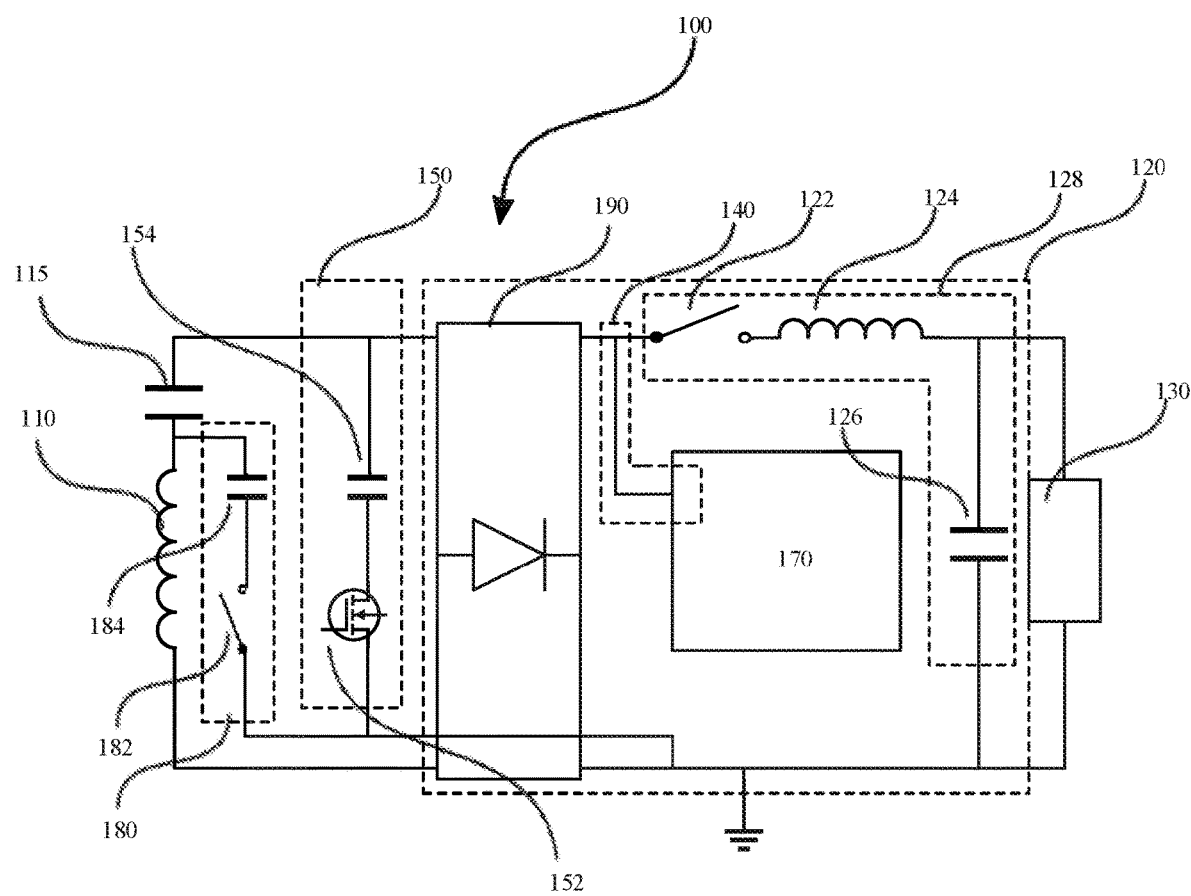
FIG. 3 is a circuit diagram of an illustrative inductive power receiving device in accordance with an embodiment.

FIG. 3 is an illustrative inductive power receiver 100 in accordance with an embodiment. In this example, the inductive power receiver 100 includes an inductive power receiver coil 110, a charging circuit 120, a measurement circuit 140, a communication circuit 150 and a load 130.

In this example, the coil 110 is configured for series tuning with a compensation capacitor.

In this example, the charging circuit 120 includes a diode bridge rectifier 190. There is a ground connection on the DC output side of the rectifier 190.

In this example, the charging circuit 120 includes a switchmode converter 128 of the buck type formed from switch 122, inductor 124 and capacitor 126. Alternatively, the charging circuit 120 could include a linear power supply.

In this example, the charging circuit 120 includes a microcontroller 170 configured to compare a voltage measured by the measurement circuit 140 to a threshold voltage. The charging circuit 120 is configured to change from operating in a first charging mode, in which power is supplied to the load at a first level to a second charging mode in which power is supplied to the load at a second level. In either or both of the first and second modes, power control can be performed via CEP packets similar to Qi standards.

In this example, the measurement circuit 140 measures a voltage at the output of the rectifier 190 and provides this measurement to the microcontroller 170 of the charging circuit 120.

In this example, the communication circuit 150 is an in-band communication circuit configured to modulate the inductive power signals to communicate with the inductive power transmitter 200. The communication circuit 150 is formed from a capacitor 154 connected via a MOSFET 152 to ground.

In this example, the load 130 is a rechargeable battery. The rechargeable battery in this example has a capacity of approximately 70 mAH. The battery is able to be charged at various charging rates. For example, the battery may be charged at 10 C for limited periods of time. This allows the battery to charge partially or completely more quickly than at lower charging rates. For example, the battery may charge at 10 C for approximately 15 seconds.

In this example, the inductive power receiver 100 also includes an over-voltage protection circuit 180 for preventing voltages in the circuit exceeding a set value. The over-voltage protection circuit is formed from a capacitor 184 connected, via switch 182, to ground from a point between the power receiving coil 110 and the series tuning capacitor 115. The over-voltage protection circuit 180 can prevent voltage at the output of rectifier 190 from exceeding a set value.

Figure 4:
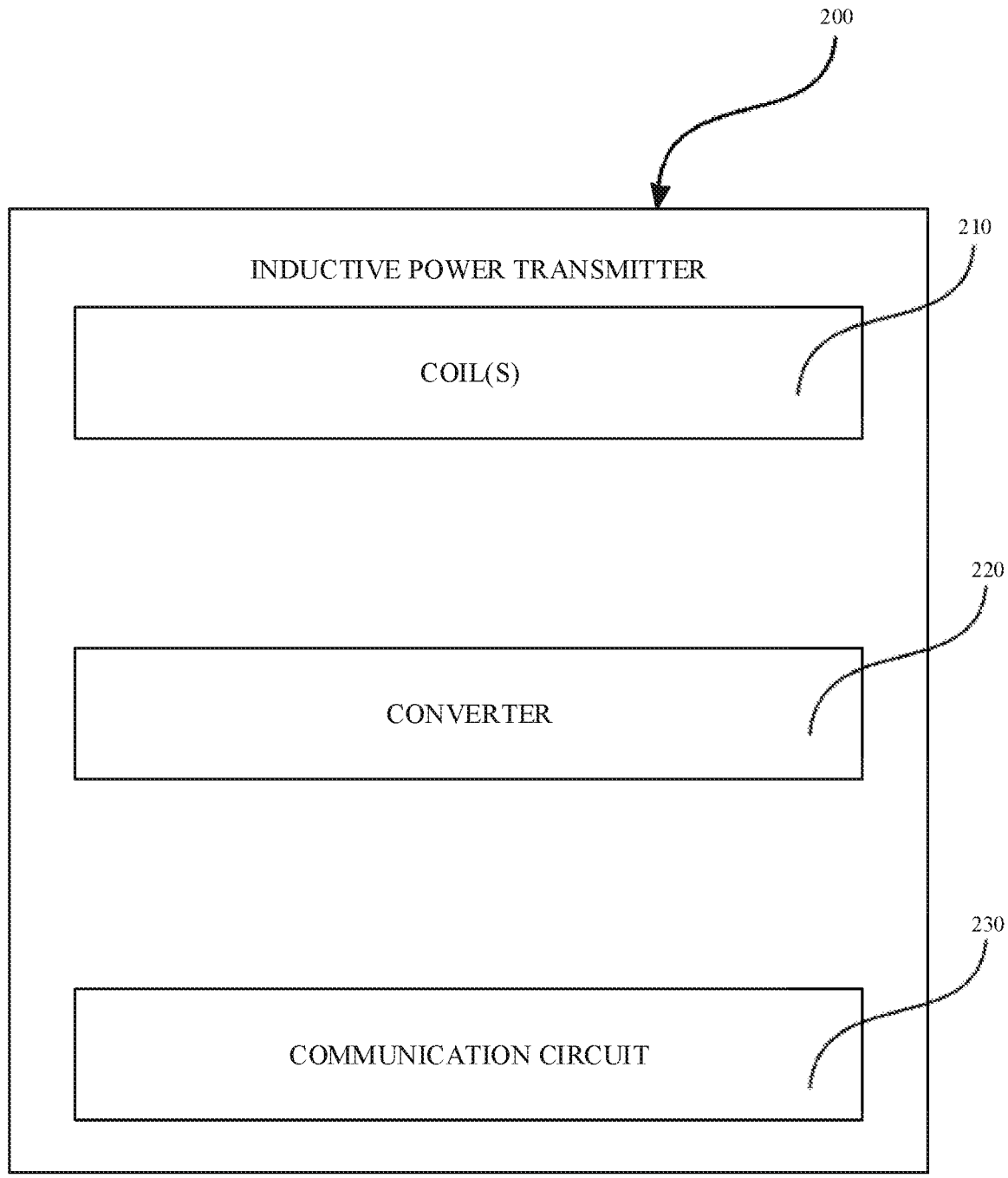
FIG. 4 is a schematic diagram of an illustrative inductive power transmitting device in accordance with an embodiment.

An illustrative inductive power transmitter 200 is shown in FIG. 4. The transmitter 200 includes at least one power transmitting coil 210 for transmitting wireless power signals, a converter 220 for providing an alternating current (AC) voltage to the power transmitting coil 210 and a communication circuit 230 for communicating with an inductive power receiver 100.

Various types of power transmitting coils can be used in the transmitter 200 to transmit wireless power signals. For example, the transmitter coil 210 can be planar or elongate depending on the application. The coil 210 could also be provided with a magnetic core that can guide and focus magnetic fields produced by the coil 210.

The transmitter 200 could have a plurality of power transmitting coils that could be connected in parallel or series or energized independently. For example, the transmitter 200 could be a charging mat with an array of transmitter coils configured to provide wireless power signals to one or more receivers placed on a charging surface of the mat.

In some examples, the transmitter 200 can have two or more coils wound about respective limbs of a magnetic core to form a coil assembly.

It will be appreciated that the coil or coils may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

The converter 220 of the inductive power transmitter 200 may be configured to convert voltage from an alternating current (AC) or direct current (DC) supply to an AC voltage for the power transmitting coil 210. The converter 220 may include a DC to AC inverter, an AC to AC converter or an AC to DC to AC converter.

It will be appreciated that various types of converter can be used to provide an AC voltage to the coil 210. For example, a simple chopper circuit can be used to provide alternating current signals to the coil 210. In such a circuit, a switch or combination of switches can alternately connect a DC supply voltage to different sides of a coil 210 to provide an alternating voltage across, and current through, the coil 210. Capacitive or inductive elements can be used to smooth the output waveform.

In some examples, the converter 220 may be a push-pull inverter in which switches operate to provide an alternating voltage across, and current through, the coil 210. In some examples, the inverter may be a resonant inverter that includes one or more capacitive elements that form(s) a resonant circuit with the coil 210 and optionally other inductive elements. Resonant inverters can include actively controlled switches that are controlled based on the resonant frequency of the inverter circuit. Resonant inverters can be soft switched using zero voltage or zero current switching, hard switched, or a variation of either.

The converter 220 can also include a DC-DC conversion stage such as a boost converter. This can be used to initially increase a DC voltage before conversion to AC voltage for the power transmitting coil 210.

The converter 220 can output AC voltage to the transmitting coil 210 over a range of voltage levels. For example, the output voltage of the converter 220 can range from a minimum of between 0V and 10V, between 2.5V and 7.5V, or approximately 5V, to a maximum of between 10V and 20V, between 12.5V and 17.5V, or approximately 15V.

The converter 220 is also configured to ramp up its output voltage after receiving a charging mode request from an inductive power receiver 100. The output voltage can increase at greater than 20 mV/ms or greater than 85 mV/ms, for example at 25 mV/ms, 50 mV/ms or 100 mV/ms. The converter 220 can stop ramping up its voltage when it is determined that the inductive power receiver 100 has switched to the second charging mode.

The communication circuit allows the inductive power transmitter 200 to communicate with the inductive power receiver 100 using either modulation of the inductive power signals (in band communication) or other communication channels (out of band communication). As discussed above, these can include signals injected or combined into the inductive power signals such as proposed in the Wireless Power Consortium Qi specification 1.1, Bluetooth®, RFID, NFC, Zigbee, Wifi RF or other communication systems.

The inductive power transmitter 200 uses the communication circuit to receive a charging mode request from the inductive power receiver 100 to begin ramping of the output voltage of the converter 220. In some examples the inductive power transmitter 200 can also use the communication circuit 230 to receive a charging mode confirmation from the inductive power receiver 100 to confirm that the receiver 100 has switched to the second charging mode. The inductive power transmitter 200 may determine that the receiver 100 has switched to the second charging mode by detecting a change in the load 130 of the receiver 100. For example, the transmitter 200 may detect an increase in current drawn by the transmitter coil 210 that is due to the receiver 100 switching to the second charging mode.

The communication circuit 230 can receive CEP packets from the inductive power receiver 100 as detailed above. In one example, the inductive power transmitter 200 determines that the receiver has switched to the second charging mode upon receipt of a CEP packet that indicates this.

Figure 5:
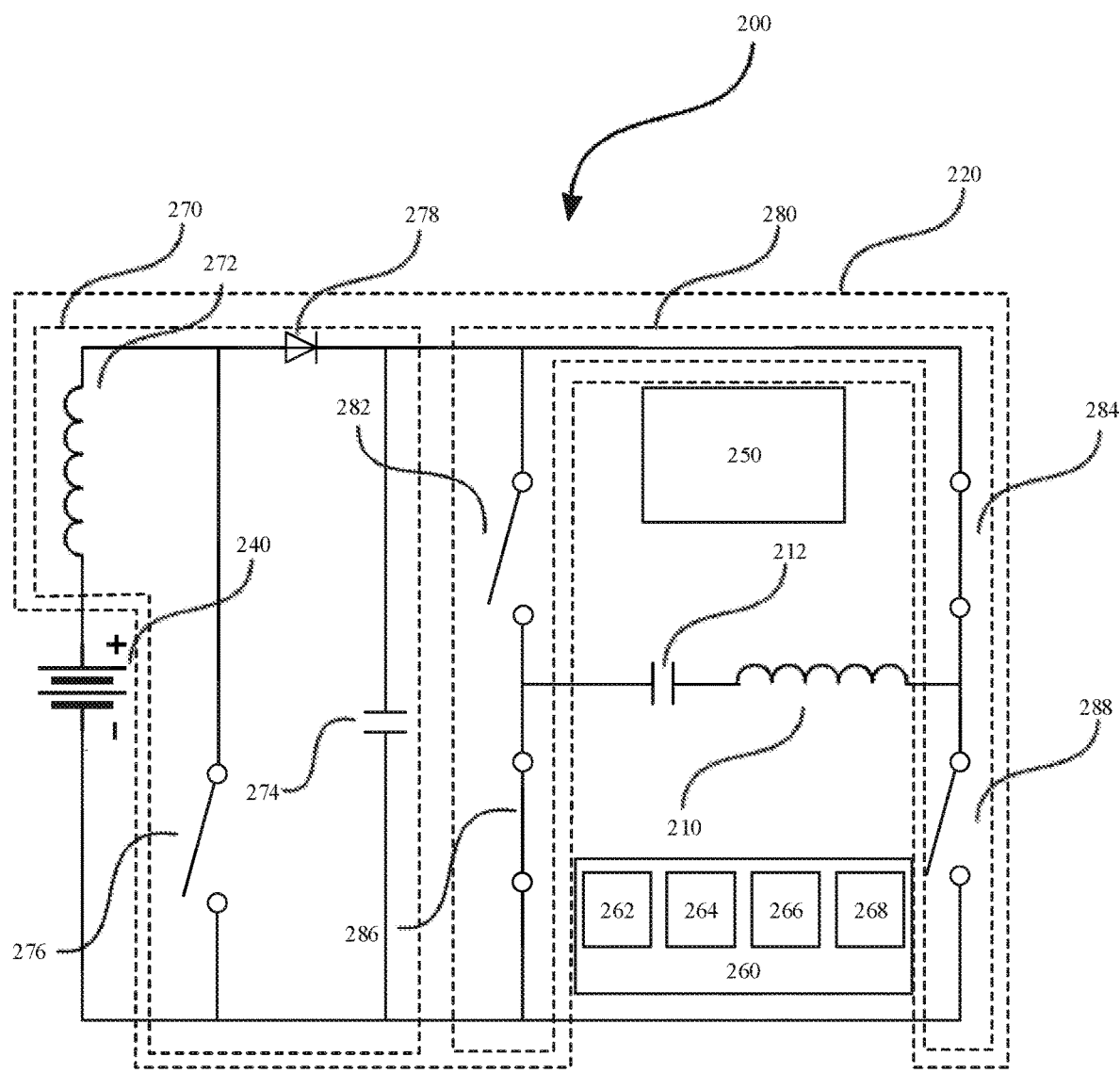
FIG. 5 is a circuit diagram of an illustrative inductive power transmitting device in accordance with an embodiment.

FIG. 5 is an illustrative inductive power transmitter 200 in accordance with an embodiment. In this example, the inductive power transmitter 200 includes an inductive power transmitting coil 210, a series tuning capacitor 212, a converter 220 including boost converter 270 and inverter 280, control circuitry 250, a communication circuit 260 and a power supply 240.

In this example, the converter 220 includes a full bridge inverter 280 formed from semiconductor switches 282, 284, 286, 288. The control circuitry 250 can operate the switches 282, 284, 286, 288 of the inverter to switch in diagonal pairs such that 282 and 288 are turned on at the same time and 284 and 286 are turned on at the same time.

The control circuitry 250 can implement phase shift control of the switches of the inverter to adjust the output power of the inverter. For example, the inverter may output maximum power when the full bridge diagonal switch pairs (282 and 288) or (284 and 286) are in phase and minimum power if they are out of phase.

In this example, the converter 220 also includes a voltage boost converter stage 270 formed from inductor 272, capacitor 274, switch 276 and diode 278. The control circuitry 250 can control the boost stage to increase the DC voltage supplied to inverter by controlling the duty cycle of the switch 276.

In this example, the control circuitry 250 is implemented with a microcontroller. The microcontroller is configured to begin gradually increasing the voltage output by the converter 220 after a charging mode request is received from an inductive power receiver 100. The output voltage is increased at a specific rate, e.g. 25 mV/ms, 50 mV/ms or 100 mV/ms. Once the transmitter 200 determines that the receiver 100 has switched to the second charging mode, it stops gradually increasing the output voltage and delivers a constant voltage at the level reached at the end of the ramp.

It will be appreciated that, when providing power to a receiver operating in the first or second mode, the inductive power transmitter 200 can incrementally adjust its output power level in response to requests for incremental power adjustment from the receiver 100. For example, the receiver 100 may transmit control error packets (CEP) based on a difference between power received in the receiver 100 and power required by the load 130. The transmitter 200 can adjust its output based on the CEP packets.

In this example, the communication circuit 260 is an in-band communication circuit configured to demodulate the inductive power signals to receive communications from the inductive power receiver 100. The communication circuit 260 is formed from a peak detector 262, an amplifier with filtering 264, AC coupling 266 and bit slicer 268.

In this example, the power supply 240 is a battery.

Figure 6:
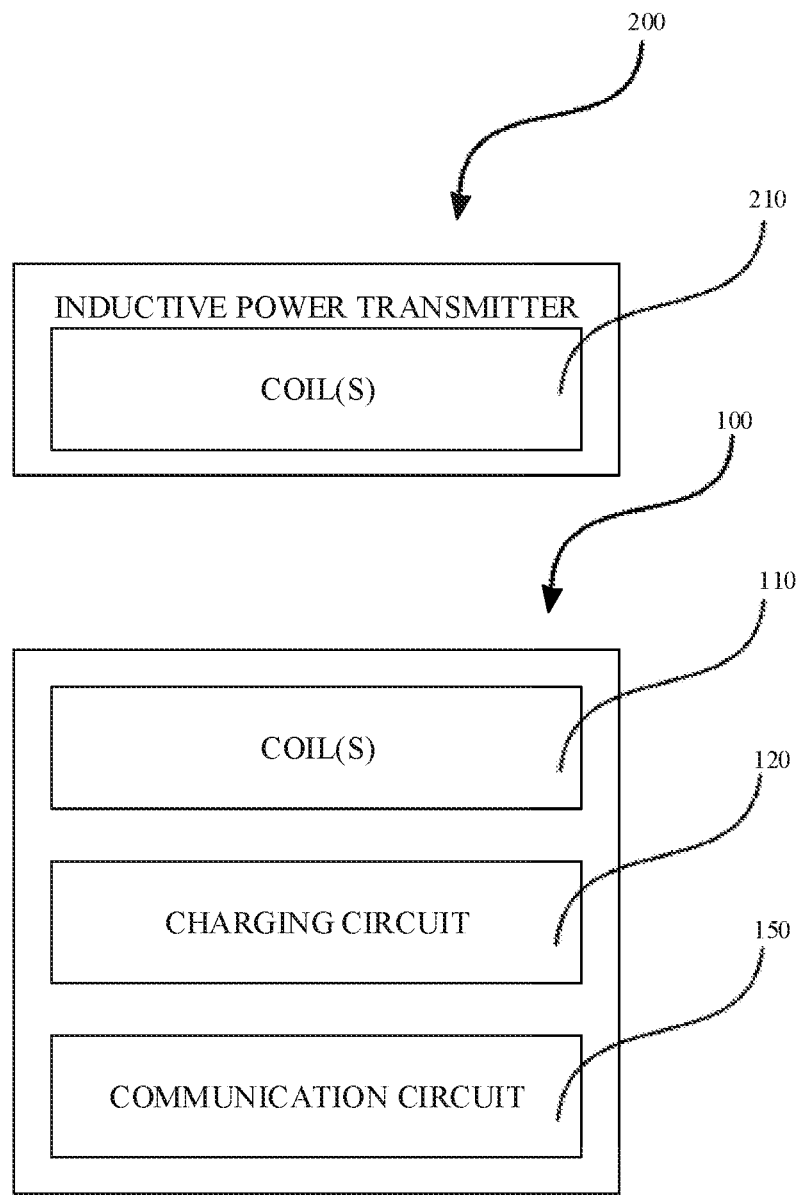
FIG. 6 is a schematic diagram of an illustrative inductive charging system in accordance with an embodiment.

FIG. 6 shows an illustrative inductive power transmission system including an inductive power transmitter 200 and an inductive power receiver 100. The inductive power transmitter 200 includes a power transmitting coil 210. The inductive power receiver 100 includes a power receiving coil 110, a charging circuit 120, and a communication module.

The receiver 100 of FIG. 6 can use the communication module to transmit a charging mode request to the transmitter 200. The transmitter 200 is configured to gradually increase the voltage provided to the transmitting coil 210 in response to receiving the charging mode request. This causes a voltage received with the power receiving coil 110 of the receiver 100 to also increase. When the voltage received with the power receiving coil 110 exceeds a predetermined level, the charging circuit 120 switches from a first lower power charging mode to a second higher power charging mode.

Figure 7:
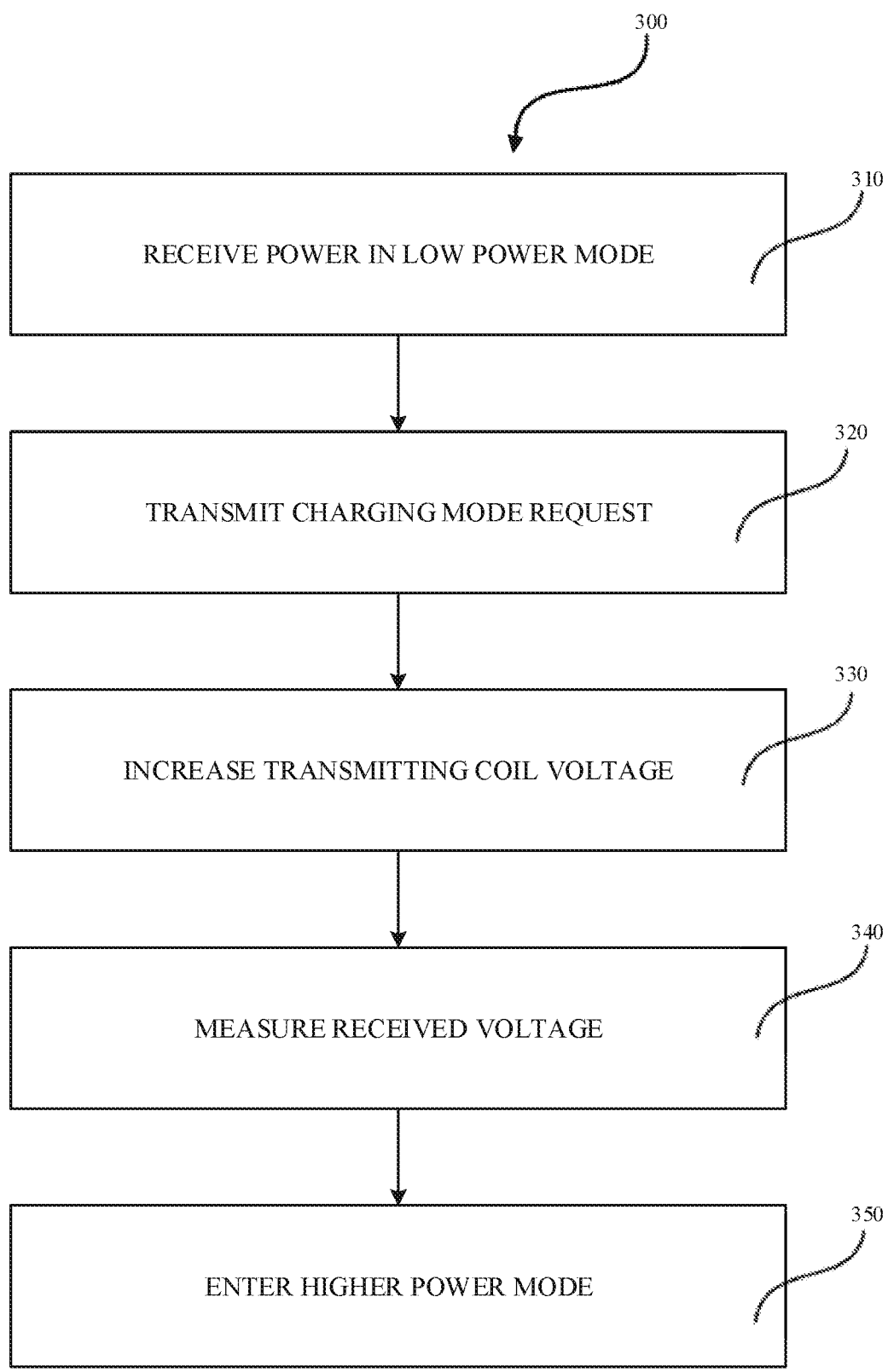
FIG. 7 is a flow chart of an illustrative method in accordance with an embodiment.

FIG. 7 shows an illustrative method 300 of inductive power transmission. This method 300 begins at step 310, in which the inductive power receiver 100 receives power in a first, lower power mode. In this mode, the receiver 100 may receive sufficient power to charge the load 130 at a rate of 1 C.

To initiate a change to a higher power mode, the inductive power receiver 100 transmits a charging mode request to an inductive power transmitter 200 at step 320. This request may be in the form of a CEP packet or a power negotiation packet.

Once the transmitter 200 receives the charging mode request, it begins to gradually increase the voltage provided from the converter 220 to the power transmitting coil 210 at step 330.

At step 340, the receiver 100 measures an indication of the voltage received in the inductive power receiving coil 110.

When it is determined that the voltage measured in step 340 exceeds a threshold, the receiver 100 enters a higher power charging mode at step 350.

The time taken between the charging mode request being transmitted and the voltage measured by the measurement circuit 140 exceeding the threshold may be less than 2 seconds, less than 1 second, less than 500 ms, less than 200 ms, less than 120 ms or less than 65 ms.

The receiver 100 may operate in the second mode for less than 120 seconds, less than 60 seconds, less than 30 seconds or less than 15 seconds.

In this figure a single ramp is shown, however there may be multiple ramp stages. For example, power supplied to the load 130 may be increased in steps as described in further detail below.

Figure 8:
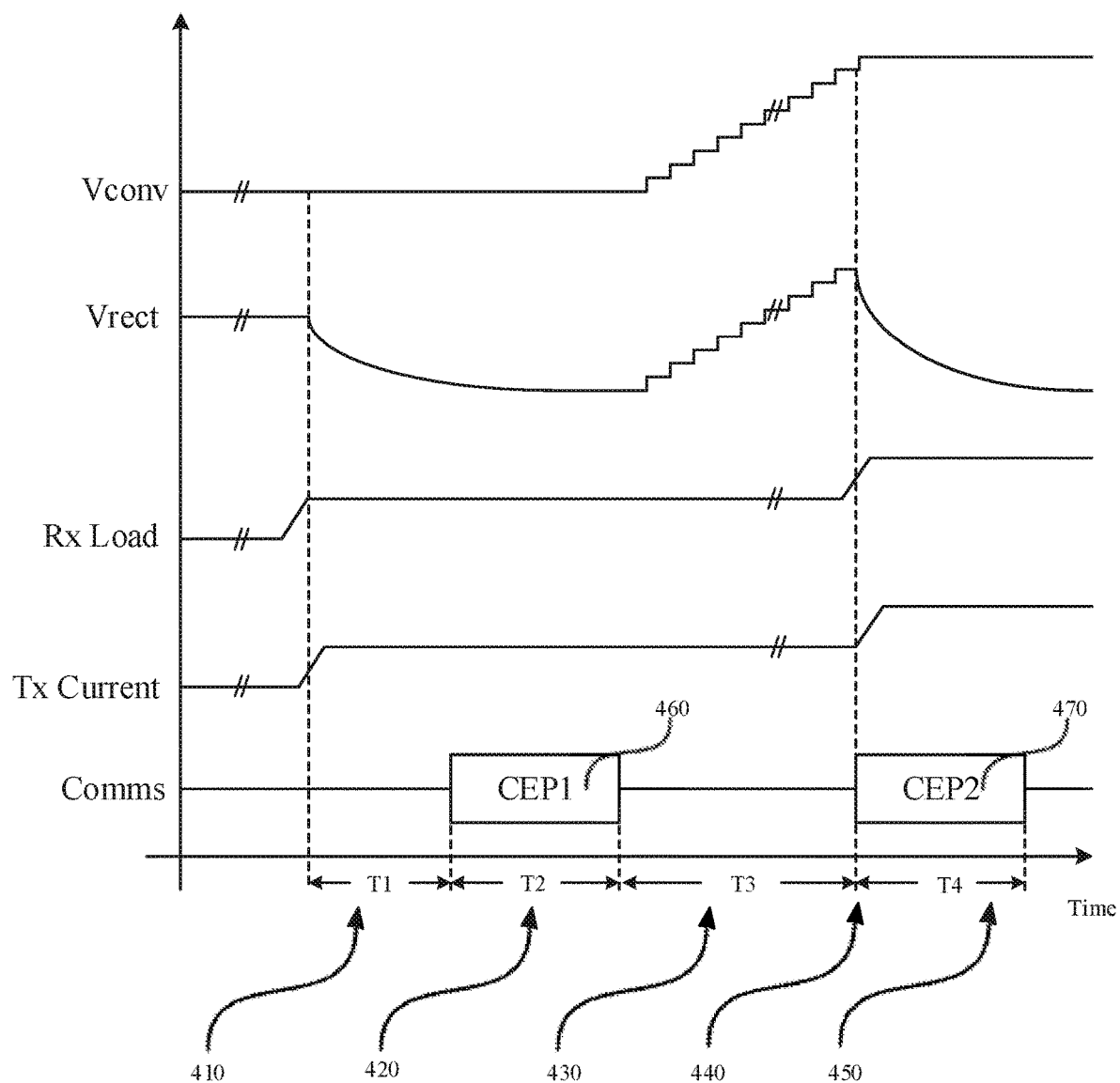
FIG. 8 is a timing diagram of an illustrative method in accordance with an embodiment.

FIG. 8 is a timing diagram showing the different stages of the transition from a first mode to a second mode according to an embodiment.

In the period 410, the receiver 100 receives power in a first, lower power mode. In the period 420, the receiver 100 transmits a charging mode request in the form of CEP packet, Power Negotiation packet or a custom packet 460. In response to the charging mode request, the transmitter 200 increases a voltage (shown in the plot of Vconv) ultimately provided to the transmitter coil 210 in period 430. In the plots of Vconv shown in FIGS. 8 and 9, Vconv represents the output of a boost converter that is provided, via an inverter, to the transmitter coil 210. At point 440, voltage Vrect reaches a threshold value and the receiver 100 switches to the second, higher power mode. This is shown in the increase in the plot of Rx Load. The receiver may enter the second mode by controlling a regulator to provide higher power to the load. In period 450, the transmitter 200 determines that the receiver 100 has switched to the second mode by either receiving CEP packet 470 (shown in the plot of Comms) or by detecting a change in the load 130 of the receiver 100, for example from an increase in the current through the transmitting coil 210, shown in the plot of Tx Current.

In periods 410, 420 and 450 the respective time intervals T1, T2 and T4 are 50 ms. In period 430 the time interval T3 is approximately 65 ms.

Figure 9A:
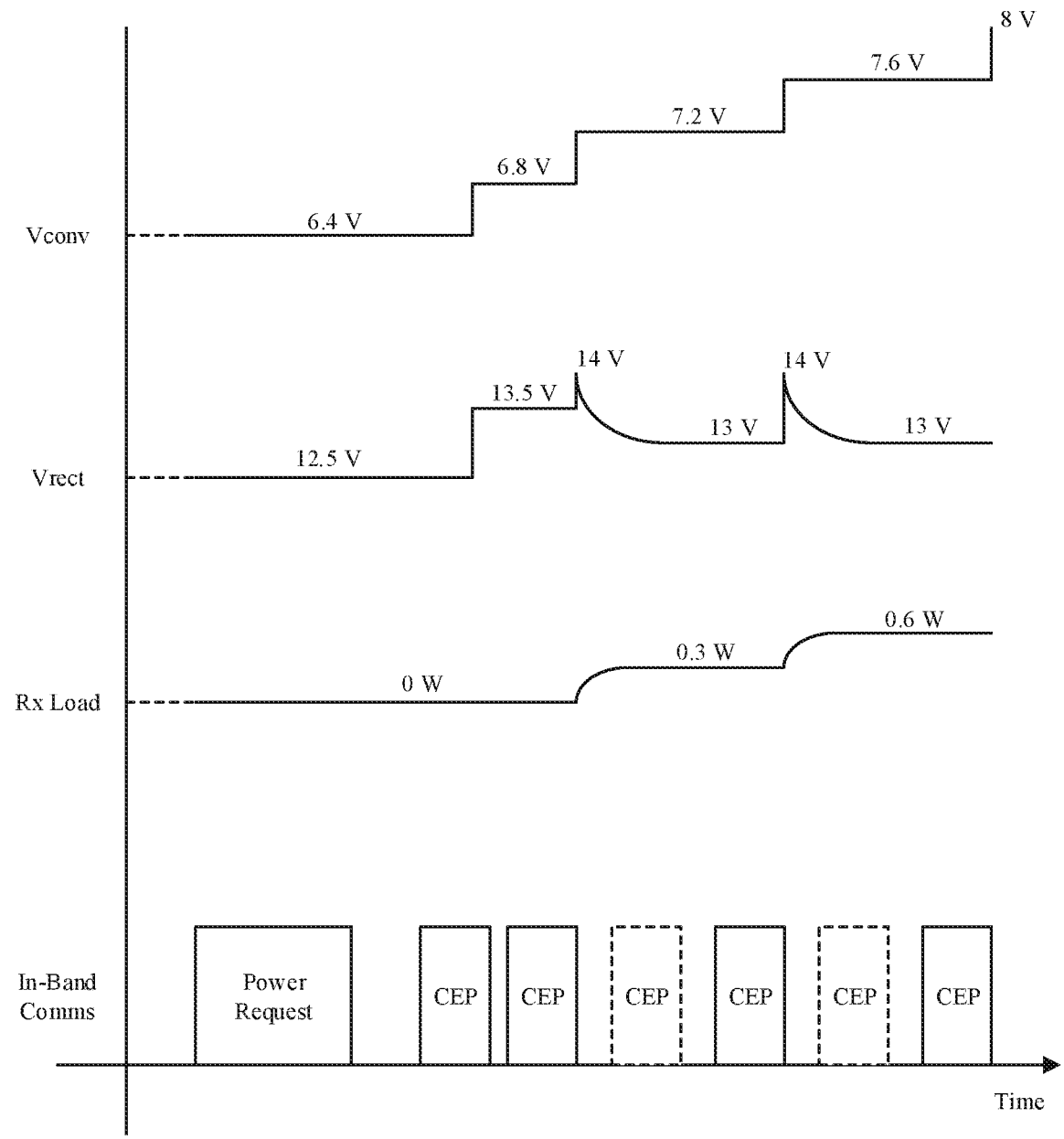
FIG. 9A is a timing diagram of an illustrative method in accordance with an embodiment.
Figure 9B:
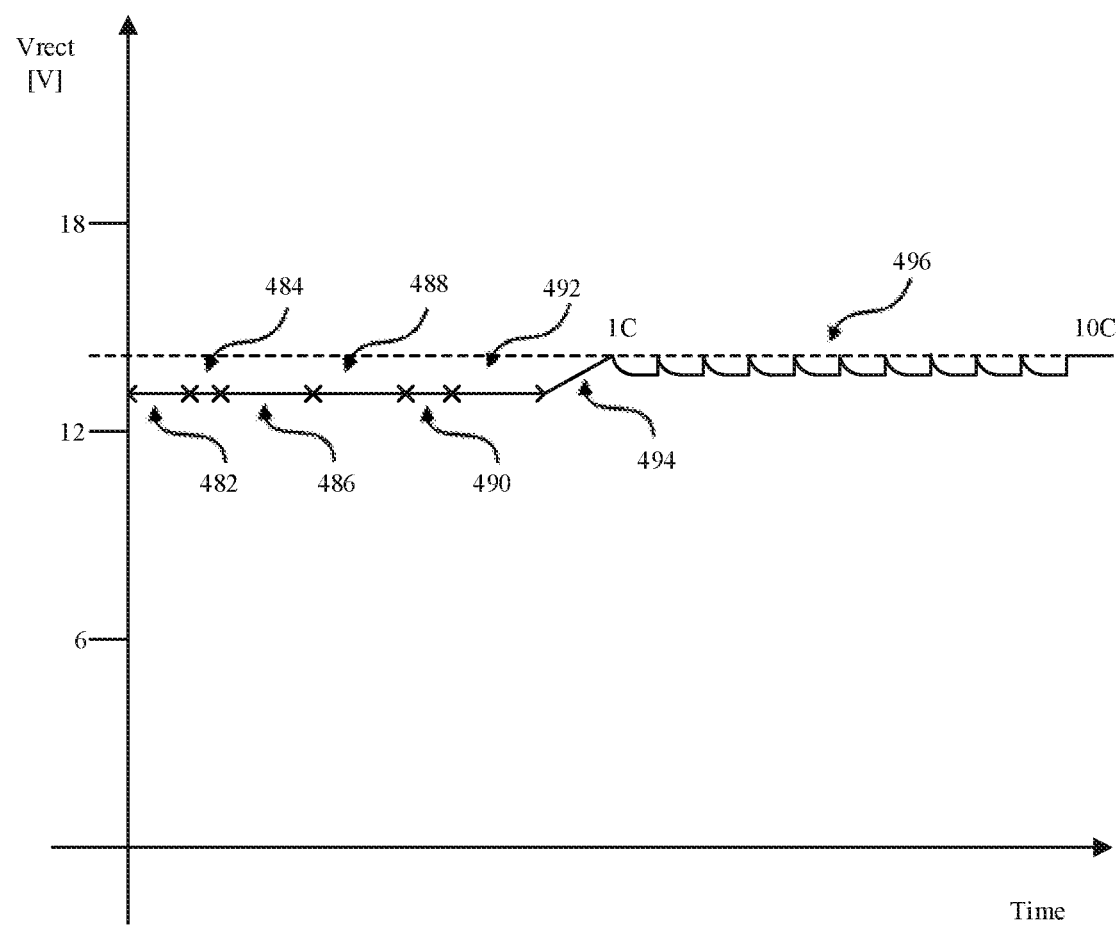
FIG. 9B is a timing diagram of an illustrative method in accordance with an embodiment.

FIGS. 9A and 9B are timing diagrams showing the stages of the transition from a first mode to a second mode according to another embodiment. In this embodiment, the charging circuit 120 increases the power to the load in steps during the transition.

As shown in FIG. 9A, the method is initiated by the receiver sending a power request packet to the transmitter. The receiver then sends CEP packets requesting increased power. Once the received voltage Vrect reaches the threshold voltage, the receiver load increases. However, in this embodiment the receiver load initially only increases to a level lower than the second power level. After a period of time, the receiver load increases again. The receiver load continues to increase in this manner until it reaches the second power level. FIG. 9B shows the behavior of Vrect as the receiver load increases from a first level to a second level during the transition, then continues to operate at the second level in the second mode.

In the example shown in FIG. 9A, the threshold voltage is 14V, the first load power level is 0.3 W, which corresponds to 1 C, and the second load power level is 3 W, which corresponds to 10 C. Once the threshold voltage of 14V is reached, for example by measuring the voltage at the output of a rectifier Vrect, the receiver load initially increases from 0 W to 0.3 W. This causes a corresponding decrease in Vrect.

While the load power is increasing, transmission of CEP packets may not be effective, which is indicated by the dashed lines in the In-band Comms plot. Once the load has substantially finished increasing to 0.3 W, the receiver may successfully transmit a CEP packet indicating the difference between the current Vrect and the threshold voltage. This causes the transmitter to increase the voltage provided from the converter, Vconv, which increases the voltage at the transmitter coil and in turn causes an increase in Vrect. Once Vrect reaches the threshold voltage again, the receiver load increases by another incremental amount of 0.3 W. This process can continue until the received power level reaches the desired level. This can be indicated by a CEP=0 packet sent from the receiver to the transmitter.

The Power Request may last 110 ms and the CEP packets may last 41 ms each.

As shown in FIG. 9B, during the periods of initial low power operation 482, OTP load 484, digital ping 486, Fw load 488, request transmitter ID 490 and power negotiation 492, Vrect is substantially constant. Vrect increases as the voltage applied to the transmitter coil increases during the period 494. During period 496, Vrect repeatedly steps up as Vconv increases, then decreases as the receiver increases the power provided to the load. This is repeated until the desired power level is reached.

In the example of FIG. 9B, during the load ramp period 496 the power to the load increases by 1 C per step until it reaches the desired power level of 10 C. The total time taken to reach 10 C is approximately 1800 ms, comprised of 100 ms for initial low power operation 482, 16 ms for OTP load 484, 165 ms for digital ping 486, 180 ms for Fw load 488, 86.5 ms for request transmitter ID 490, 150 ms for power negotiation 492, 100 ms for initial ramp of Vrect 494 and 1000 ms for the ramp up of power to the load 496.

It will be appreciated that the values of voltage and receiver load and step sizes thereof are only examples, and different values may be useful in different situations. Additionally, the load ramp may not be linear; i.e. the step sizes may change throughout the ramp. The step size may be controlled by a proportional-integral (PI) control loop such that the amount of adjustment is proportional to the instantaneous and accumulated error between the measured voltage and the threshold voltage. Vrect is also more sensitive to load changes at high loads, and the battery cell impedance can increase over time, requiring more steps to reach the desired charging rate.

The ramp may include a phase shift ramp phase, which correspondingly increases the duty cycle of power supplied to the transmitter coil 210, followed by an amplitude ramp phase in which the amplitude of voltage supplied to the transmitter coil 210 is increased. In one example, the duty cycle of power supplied to the coil can be increased by decreasing the phase shift between the diagonal pairs of full bridge switches until either the receiver enters the second charging mode or the duty cycle of the coil 210 reaches 100%. If the duty cycle reaches 100% and the receiver has not entered the second charging mode (i.e. the operating state of the transmitter is not sufficient to supply the desired level of power to the receiver), the transmitter 200 increases the amplitude of voltage supplied by the converter 220 to the transmitter coil 210 until the receiver enters the second charging mode. The duty cycle increase can be performed by the control circuitry 250 controlling the phase shift of the pairs of switches of the inverter 280. The amplitude increase can be performed by the control circuitry 250 increasing the voltage output by the boost converter stage 270.

Figure 10:
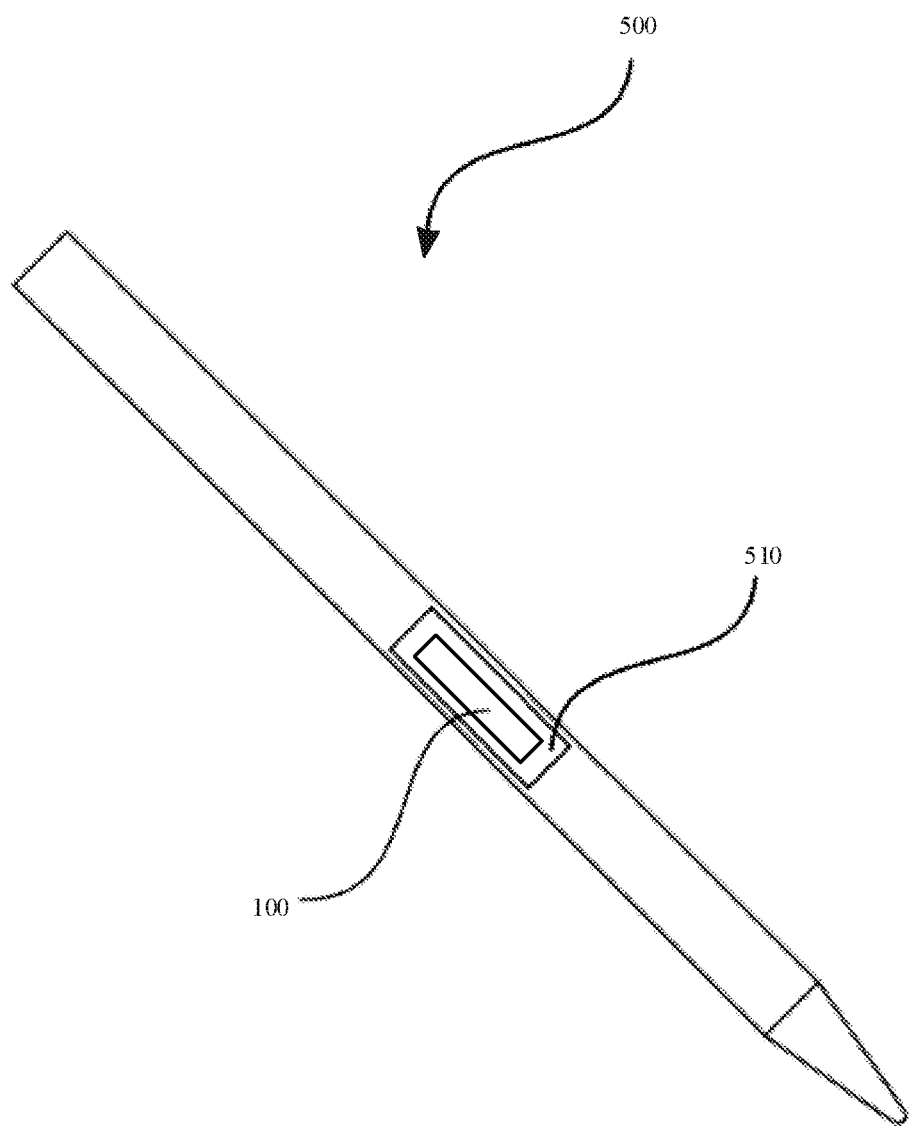
FIG. 10 is an illustrative electronic accessory including an inductive power transmitting device in accordance with an embodiment of the invention.

FIG. 10 shows an illustrative device 500 including an inductive power receiver 100. In this case, the device 500 is an electronic accessory in the form of an electronic pencil or stylus. The accessory 500 includes a receiver 100 in a compartment 510.

Figure 11:
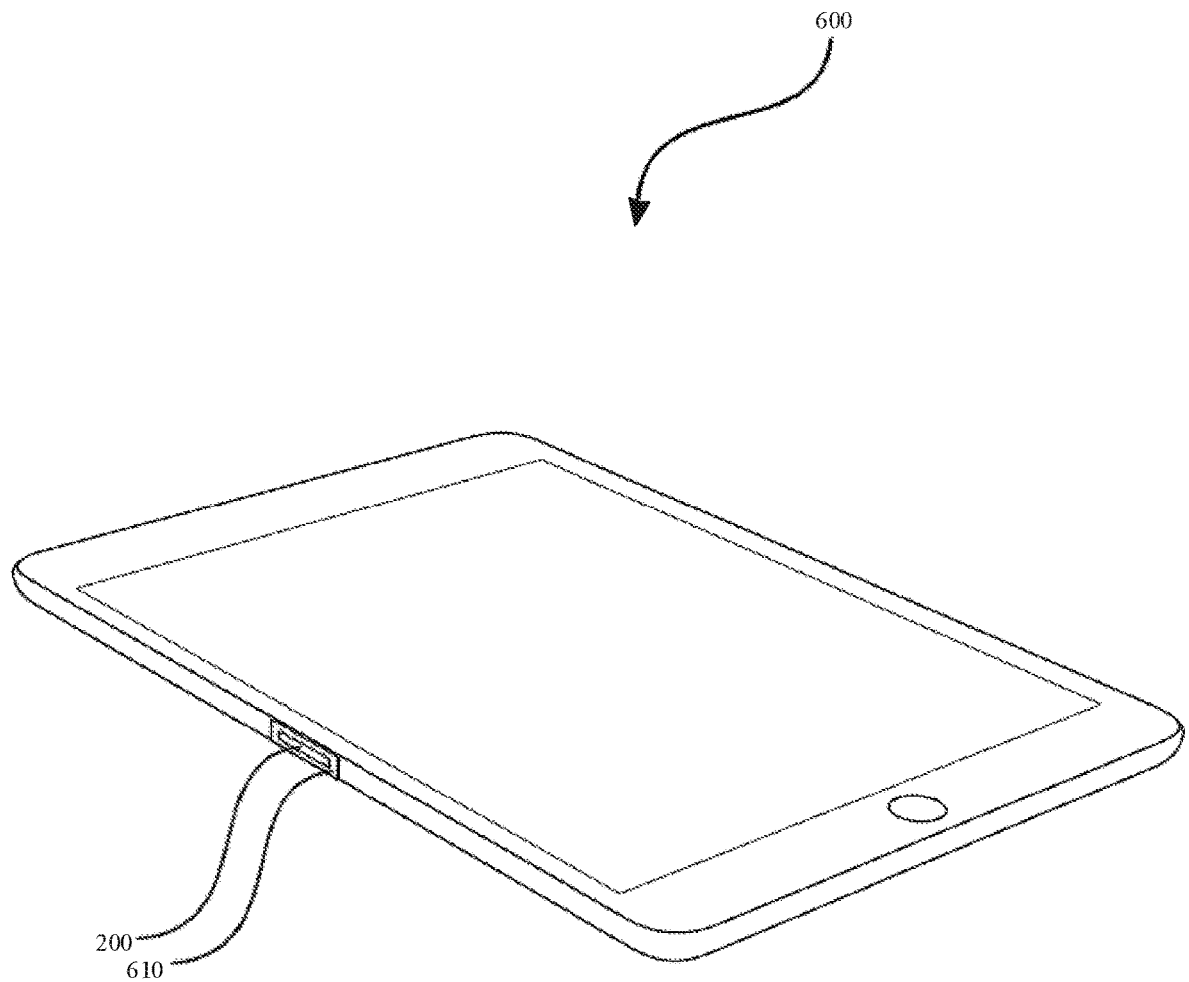
FIG. 11 is a is an illustrative charging device including an inductive power transmitting device in accordance with an embodiment of the invention.

FIG. 11 shows an illustrative device 600 including an inductive power transmitter 200. In this case, the device 600 is a tablet computer. The tablet computer includes a transmitter 200 in a compartment 610.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power receiving device comprising:
   a power receiving coil configured to receive power wirelessly from an inductive power transmitting device;
   a communication circuit configured to transmit a charging mode request to the inductive power transmitting device;
   a measurement circuit configured to measure a converter voltage generated using power received with the power receiving coil;
   a charging circuit configured to:
   supply power received with the power receiving coil to a load in a first mode,
   determine whether the converter voltage exceeds a threshold voltage;
   in response to determining the converter voltage exceeds the threshold voltage after sending, with the communication circuit, the charging mode request, switch to supplying power received with the power receiving coil to the load in a second mode different from the first mode; and
   in response to determining the converter voltage coil exceeds the threshold voltage before the charging mode request is sent, prevent at least a portion of the power received with the power receiving coil from reaching the load.

2. The inductive power receiving device of claim 1, wherein the charging circuit is configured to supply higher power to the load in the second mode and lower power to the load in the first mode.

3. The inductive power receiving device of claim 2, wherein the charging circuit is configured to supply 5 watts or less to the load in the first mode and to supply more than 5 watts to the load in the second mode.

4. The inductive power receiving device of claim 2, wherein the charging circuit is configured to supply less than 3 watts to the load in the first mode and to supply approximately 3 watts or more to the load in the second mode.

5. The inductive power receiving device of claim 2, wherein the load comprises a battery and the charging circuit is configured to supply power to the battery at a rate of less than 2 C in the first mode and at a rate of at least 5 C in the second mode.

6. The inductive power receiving device of claim 1, wherein the charging circuit includes a voltage rectifier and a voltage regulator.

7. The inductive power receiving device of claim 6, wherein the measurement circuit is further configured to measure the converter voltage at an output of the voltage rectifier.

8. The inductive power receiving device of claim 1, wherein the measurement circuit is further configured to measure the converter voltage at the power receiving coil.

9. The inductive power receiving device of claim 1, wherein the time between the charging mode request being sent and the converter voltage determined by the measurement circuit exceeding the threshold voltage is less than 120 ms.

10. The inductive power receiving device of claim 1, wherein the charging circuit is configured to operate in the second mode for less than 30 s.

11. The inductive power receiving device of claim 1, further comprising overvoltage protection circuitry configured to limit a voltage in the inductive power receiving device to an over voltage limit and the threshold voltage is lower than the over voltage limit.

12. The inductive power receiving device of claim 11, wherein the threshold voltage is between 12V and 16V.

13. The inductive power receiving device of claim 1, wherein the inductive power receiving device is an electronic pencil or stylus.

14. The inductive power receiving device of claim 1, wherein the communication circuit is configured to transmit requests for incremental power increases or decreases during the first mode or second mode.

15. An inductive power transmitting device comprising
a power transmitting coil;
a communication circuit configured to receive a charging mode request from an inductive power receiving device, the charging mode request requesting one of at least a first, lower power charging mode and a second, higher power charging mode;
a converter configured to provide an alternating current voltage to the power transmitting coil and, responsive to a charging mode request for the second, higher power charging mode, gradually increase the voltage after receiving the charging mode request and stop gradually increasing the voltage once the inductive power receiving device changes from the first, lower power charging mode to the second, higher power charging mode.

16. The inductive power transmitting device of claim 15, wherein the converter is configured to increase the voltage provided by the converter at greater than 20 mV/ms.

17. The inductive power transmitting device of claim 15, wherein the inductive power transmitting device is configured to determine that the inductive power receiving device has changed from the first, lower power charging mode to the second, higher power charging mode based on measuring a change in load or the communication circuit receiving a charging mode confirmation from the inductive power receiving device.

18. The inductive power transmitting device of claim 15, wherein the charging mode request is a CEP or power negotiation packet requesting a 7.5 W or 15 W mode.

19. The inductive power transmitting device of claim 15, wherein the charging mode request is a CEP or power negotiation packet requesting a 3 W mode.

20. The inductive power transmitting device of claim 15, wherein the converter is configured to gradually increase the voltage provided to the coil in a series of step increases until the receiving device changes from the first, lower power charging mode to the second, higher power charging mode.

21. The inductive power transmitting device of claim 20, wherein the time between the charging mode request being sent and the inductive power receiving device changing from the first, lower power charging mode to the second, higher power charging mode is less than 2 s.

22. The inductive power transmitting device of claim 15, wherein the converter includes an inverter stage and a boost converter stage.

23. The inductive power transmitting device of claim 22, wherein the converter is configured to gradually increase the voltage provided to the coil by controlling a phase shift of switches of the inverter stage.

24. The inductive power transmitting device of claim 23, wherein the converter is configured to further gradually increase the voltage provided to the coil by increasing a voltage output by the boost converter stage.

25. A method comprising:
receiving power wirelessly with an inductive power receiving device in a first lower power mode;
transmitting a charging mode request to an inductive power transmitting device;
measuring a converter voltage generated using power received with a power receiving coil;
receiving power wirelessly in a second higher power mode when the converter voltage exceeds a threshold voltage.

26. A system comprising:
an inductive power transmitting device including:
a power transmitting coil; and
an inductive power receiving device including:
a power receiving coil configured to receive power wirelessly from the inductive power transmitting device,
a communication circuit configured to transmit a charging mode request to the inductive power transmitting device, and
a charging circuit configured to supply power received with the power receiving coil to a load;
wherein a gradually increasing voltage is applied to the power transmitting coil once the charging mode request is received, and the charging circuit switches from a first lower power receiving mode to a second higher power receiving mode once a converter voltage generated using power received with the power receiving coil exceeds a predetermined level.

27. An inductive power receiving device comprising:
a power receiving coil configured to receive power wirelessly from an inductive power transmitting device;
a communication circuit configured to transmit a charging mode request to the inductive power transmitting device, the charging mode request requesting one of at least a first, lower power charging mode and a second, higher power charging mode;
a measurement circuit configured to measure a converter voltage generated using power received with the power receiving coil;
a charging circuit configured to:
supply power received with the power receiving coil to a load in the first mode;
determine whether the converter voltage exceeds a threshold voltage;
in response to determining the converter voltage exceeds the threshold voltage after sending, with the communication circuit, a charging mode request for the second higher power charging mode, switch to supplying power received with the power receiving coil to the load in the second mode different from the first mode.

28. The inductive power receiving device of claim 27, wherein the charging circuit is configured to supply 5 watts or less to the load in the first mode and to supply more than 5 watts to the load in the second mode.

29. The inductive power receiving device of claim 27, wherein the charging circuit is configured to supply less than 3 watts to the load in the first mode and to supply approximately 3 watts or more to the load in the second mode.

30. The inductive power receiving device of claim 27, wherein the load comprises a battery and the charging circuit is configured to supply power to the battery at a rate of less than 2C in the first mode and at a rate of at least 5C in the second mode.

31. The inductive power receiving device of claim 27, wherein the charging circuit is configured to operate in the second mode for less than 30s.

32. The inductive power receiving device of claim 27, further comprising overvoltage protection circuitry configured to limit a voltage in the inductive power receiving device to an over voltage limit and the threshold voltage is lower than the over voltage limit.

33. The inductive power receiving device of claim 32, wherein the threshold voltage is between 12V and 16V.

34. The inductive power receiving device of claim 27, wherein the inductive power receiving device is an electronic pencil or stylus.

35. The inductive power receiving device of claim 27, wherein the communication circuit is configured to transmit requests for incremental power increases or decreases during the first mode or second mode.

* * * * *